United States Patent [19]

Reyes

[11] Patent Number: 5,502,871
[45] Date of Patent: Apr. 2, 1996

[54] HIGH CAPACITY DUST AND LITTER COLLECTOR

[76] Inventor: Bernard B. Reyes, 510 Mokauea St., Honolulu, Hi. 96819

[21] Appl. No.: 418,290

[22] Filed: Apr. 7, 1995

[51] Int. Cl.$^6$ ................................................. A47L 13/52
[52] U.S. Cl. ............................................. 15/257.1; 294/55
[58] Field of Search ............................. 15/257.1, 257.7, 15/257.9, 257.5, 257.6; 294/55

[56] References Cited

U.S. PATENT DOCUMENTS

| D. 267,592 | 1/1983 | Payne, Jr. et al. | D32/74 |
|---|---|---|---|
| 1,748,336 | 2/1930 | Finnell | 15/257.7 X |
| 3,861,730 | 1/1975 | Ringo | 15/257.1 X |
| 3,971,095 | 7/1976 | Fish | 15/257.7 |
| 4,240,656 | 12/1980 | Eiffinger | 15/257.1 X |
| 4,344,648 | 8/1982 | Mapp | 294/55 |
| 4,357,728 | 11/1982 | Pravettoné | 15/257.4 |
| 4,562,611 | 1/1986 | Marttinen | 15/257.7 |
| 4,686,734 | 8/1987 | Kahan | 15/257.1 |
| 5,012,542 | 5/1991 | Lynn | 15/257.1 X |
| 5,343,589 | 9/1994 | Davenport | 15/257.7 X |

*Primary Examiner*—Chris K. Moore
*Attorney, Agent, or Firm*—David L. Baker; Henry S. Miller; Rhodes & Ascolillo

[57] ABSTRACT

A high capacity dust and litter collector including a five sided container having a rear mounted axle and wheels and angulated leading edge with a rubber blade that cause the container to tilt rearward about the axle, tending to cause the contents to remain in the container. A handle attached to the rear of the container curves forward over the container and terminates forward of the midpoint of the bottom wall of the container balancing out the effects of the rearward tilt. Pockets in the rear and side walls accept the wheels making then flush with the side walls of the container.

10 Claims, 2 Drawing Sheets

HIGH CAPACITY DUST AND LITTER COLLECTOR

BACKGROUND OF THE INVENTION

1. Field of the Invention

This invention relates generally to hand operated collection devices and more particularly to such a device having a high storage capacity especially for the collection of dust and litter.

2. Description of the Prior Art

Hand operated collection devices are usually part of a combination, the includes a broom used in conjunction with the collector. As often seen in theaters and amusement parks the collector is essentially an open sided box with part of the cover removed and a long handle of wood, plastic or wire that allows the user to stand upright and sweep the dust and litter into the box. The handle is hinged at the connection with the box and positioned so that the closed end of the box drops when the collector is lifted from the floor. When the closed end drops the open end rises causing the litter to drop to the closed end of the box where it is retained until emptied by manually reversing the process. That is, open end down over a trash barrel and closed end up allowing the trash to fall out of the box.

One of the drawbacks of the typical dust collector is the proclivity for litter once collected to drop out of the collector as it begins to fill and is reused by placing on the floor. This leads to another disadvantage of the currently available collectors and that is their limited storage capacity. Existing collectors will handle and store litter measured in ounces, and lack the size and structure to collect, store and move larger and heavier quantities of litter.

U.S. Patents that show the state of the art with regard to dust and litter collectors include; U.S. Pat. No. 4,344,648 issued Aug. 17, 1982 to Mapp shows a special purpose dust pan for use with sliding glass doors, U.S. Pat. No. 4,357,728 issued Nov. 9, 1982 to Pravettone discloses a refuse container that has characteristics of a dust pan. A more conventional style of dust pan is seen in U.S. Pat. No. 4,562,611 issued Jan. 7, 1986 to Marttinen. A U.S. Pat. No. 4,686,734 to Kahan was issued Aug. 18, 1987 for a spill inhibiting dust pan. A U.S. Pat. No. Des. for a dust pan was issued Jan. 11, 1983 to Payne, Jr. et al. U.S. Pat. No. Des. 267,592, disclosing open handle single piece construction.

The prior art is devoid of a high capacity dust and litter collector of the type and design disclosed and claimed herein. The prior art fails to anticipate the claimed invention.

SUMMARY OF THE INVENTION

The invention is directed to a dust and litter collection and storage device that has the ability to collect, store and move larger amounts of material than any existing similar device. In addition, the disclosed device is designed and constructed in a manner that will tend to retain the collected material rather than allowing it to spill out when positioned for use. In its basic form the collector is a box open at one end and substantially open at the top. An axle is placed across the outside of the box on the closed end near the surface closest to the ground or floor. Wheels are located at each end of the axle and turn in recessed areas in the box designed for the purpose. An elongated handle containing at least two angles is connected to the box above the axle and curves forward over the box, terminating in a hand grip forward of a transverse line through the mid-point of the axis running from front to rear of the plane of the bottom wall of the box. Just forward of the rear wall where the handle connects, the side walls slope down to a point just short of the leading edge of the bottom wall. The leading edge of the bottom wall is angled down slightly causing the box to pivot on the axle and raising the storage and receiving bin formed by the box. In addition, a pliable rubber blade encloses the leading edge and extends forward of the bottom wall not only making the pickup of dust and litter easier but also increasing the rearward inclination of the bottom wall. At rest, the box sits on the two wheels and the rubber blade. The position of the handle creates a delicate balance that prevents the bin from tipping backward when standing alone. Litter in the bin also tends to prevent accidental tipping.

In use, the collector is lifted easily by the hand grip and rolled to the site where the litter is to be collected. Releasing the hand grip will cause the collector to remain in place and the user is able to place the litter in the bin, preferably by sweeping. The collector is emptied by simply grasping the handle and tipping the bin up and allowing the litter to slide into another container or pile.

It is therefore an object of the invention to provide a new and improved high capacity dust and litter collector.

It is another object of the invention to provide a new and improved high capacity dust and litter collector that resists spilling contents when in use.

It is a further object of the invention to provide a new and improved high capacity dust and litter collector that is light in weight and easy to move.

It is still another object of the invention to provide a new and improved high capacity dust and litter collector that is more efficient than any similar hitherto known device.

It is still a further object of the invention to provide a new and improved high capacity dust and litter collector which may be easily and efficiently manufactures and marketed.

It is still another object of the invention to provide a new and improved high capacity dust and litter collector which is of a durable and reliable construction.

These together with other objects of the invention, along with the various features of novelty which characterize the invention, are pointed out with particularity in the claims annexed to and forming a part of this disclosure For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF A PREFERRED EMBODIMENT

Figure 1:
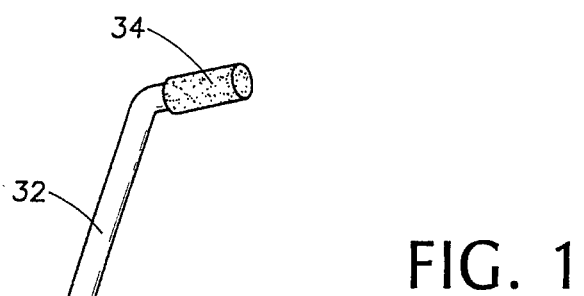
FIG. 1 is a perspective view of the invention.

Referring now to FIG. 1, the invention is shown generally at 10 and consists of a collector container having a top wall 12, a back wall 14, a bottom wall 16 and two side walls 18 and 20. The rear wall 14 and side walls 18 and 20 are recessed at 22 and 24 to provide an exterior pocket for the wheels 26 and 28 which are connected by axle 30. A handle 32 is affixed to the rear wall 14 and contains at least two angles causing the hand grip 34 to extend forward of the midpoint of the bottom wall 16. The leading edge 36 of the bottom wall 16 is enclosed in a pliable rubber blade that readily conforms to an abutting surface. The blade and ends of the side walls 18,20 flare out in the area of the leading edge of the bottom wall.

Figure 2:
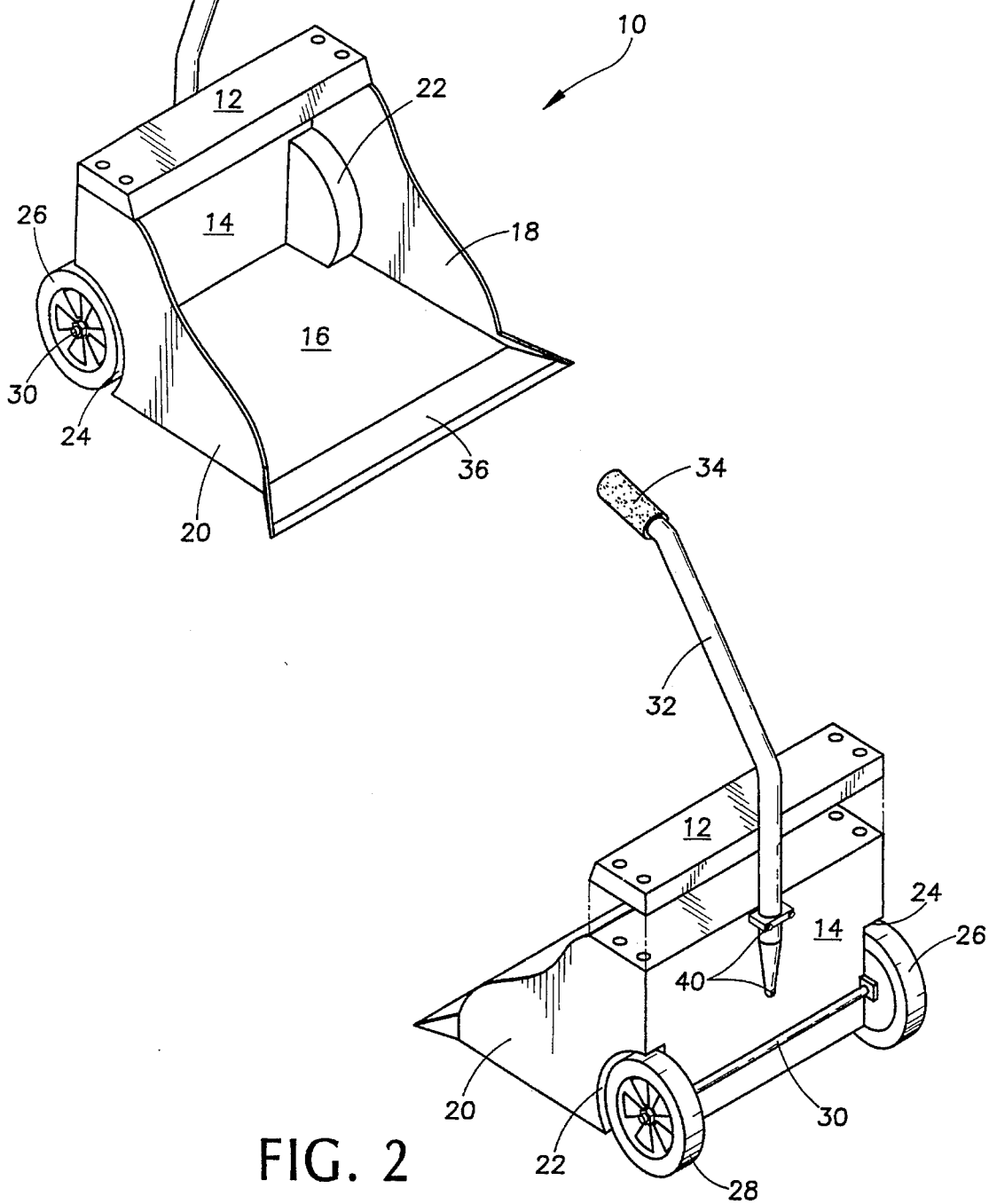
FIG. 2 is a perspective view of the back of the invention.

Concerning FIG. 2, the wheels 26 and 28 are connected by the axle 30 which is attached to the outside back wall 14 of the collector container. The pockets 22 and 24 allow the wheels to remain within the overall width dimensions of the container and therefore requiring less storage space and allowing the collector to be utilized in areas of reduced dimension.

Figure 3:
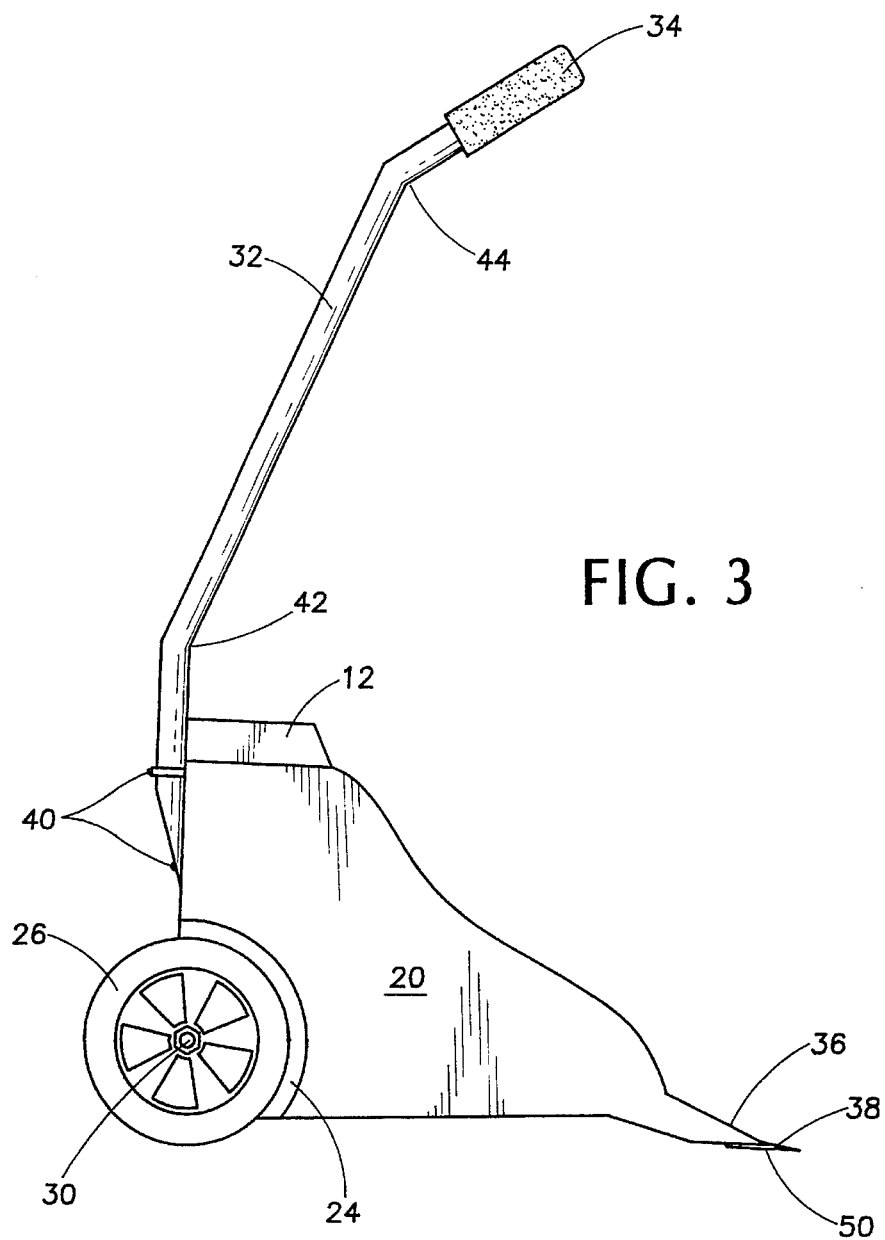
FIG. 3 is a side elevation view of the invention.

Regarding FIG. 3, the leading edge 36 of the bottom wall 16 is angled slightly down, raising the front of the collection bin by pivoting around the axle. The addition of the blade 38 increases the height of the leading edge increasing the amount of the rearward tilt which is counterbalanced by the position of the forward leaning handle. This feature tends to cause the litter collected in the container to remain in the bin when the collector is in the normal position for use and allows more to be collected before emptying the container.

The handle is connected to the back wall of the collector by one or more fasteners 40 in a conventional and routine manner. The handle includes at least two angles 42,44 that will bring the hand grip 34 forward of the mid-point of the bottom wall thereby creating the balance which allows the rearward tilt of the bottom wall of the container bin.

Figure 4:
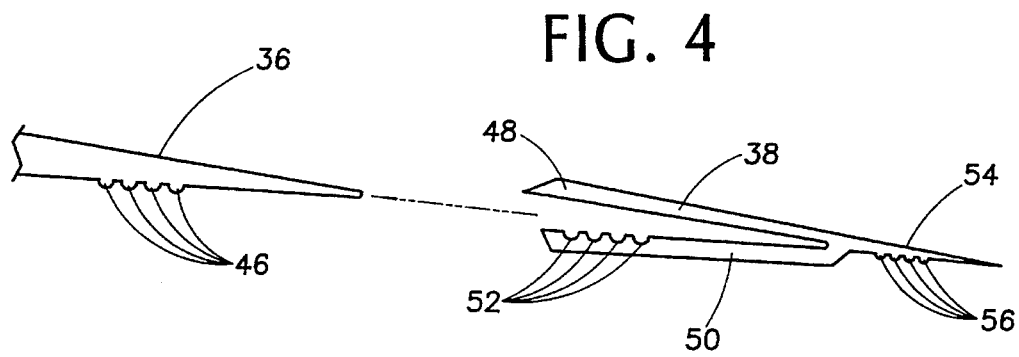
FIG. 4 is a cross sectional view of the bottom wall lip and the blade.

In FIG. 4, the leading edge 36 of the bottom wall 16 is shown including the blade 38. The leading edge is tapered and includes a plurality of securing ridges 46 which extend across the width of the leading edge. The blade engagement portion is bifurcated with one arm 48 riding over the top surface of the leading edge and the other arm 50 under the leading edge and containing a plurality of grooves 52 adapted to engage the securing ridges 46 on the leading edge 36. The blade 38 tapers to an edge 54 of a thickness appropriate for the designed use. A plurality of ridges 56 on the underside of the blade provide some stability to the otherwise pliable blade.

The collector may be formed in several sizes, of metal or plastic and is made of a rugged constriction suitable for use out of doors. The rubber blade is a consumable item and is designed to be easily replaceable.

It should be understood, of course, that the foregoing disclosure relates to only a preferred embodiment to the invention and that numerous modifications or alterations may be made therein without departing from the spirit and scope of the invention as set forth in the appended claims.

What is claimed is:

1. A high capacity dust and litter collector apparatus comprising: a container having connected walls including, a top wall, a bottom wall, two opposed side walls and a rear wall connecting the top, bottom and side walls and forming an open void, where the top wall is smaller in one dimension than the bottom wall and the side walls taper from the end of the top wall to the distal end of the bottom wall; a handle affixed to the rear wall, extending forward over the top wall terminating at a point forward of the mid-point of the bottom wall; rolling means operatively connected to the exterior back wall of the container, and blade means attached to the distal edge of said bottom wall for engaging a surface from which dust and litter are to be collected by said collector.

2. A high capacity dust and litter collector according to claim 1 further including: an axle means affixed to the collector for attaching the rolling means to the collector.

3. A high capacity dust and litter collector according to claim 2 wherein: the rolling means includes a wheel mounted on each end of the said axle means.

4. A high capacity dust and litter collector according to claim 3 further including: recessed pockets formed in the back and side walls of the container for receiving the said wheels.

5. A high capacity dust and litter collector according to claim 4 wherein: the distal edge of said bottom wall is at an angle to the plane of the surface of the bottom wall and away from the interior of the container.

6. A high capacity dust and litter collector according to claim 5 wherein: the distal edge of the bottom wall is angled sufficiently to cause the container to tilt rearwardly about the said axle means.

7. A high capacity dust and litter collector according to claim 6 wherein: the blade is formed of pliable rubber.

8. A high capacity dust and litter collector according to claim 7 wherein: the container is formed of plastic.

9. A high capacity dust and litter collector according to claim 8 wherein: the container is formed of metal.

10. A high capacity dust and litter collector according to claim 9 wherein: the handle includes means for gripping.

\* \* \* \* \*